United States Patent [19]
Berecz

[11] Patent Number: 4,687,394
[45] Date of Patent: Aug. 18, 1987

[54] COMPOSITE RIVET WITH DEFORMABLE PLASTIC LOCKING RING

[75] Inventor: Imre Berecz, El Toro, Calif.

[73] Assignee: Microdot Inc., Darien, Conn.

[21] Appl. No.: 738,961

[22] Filed: May 29, 1985

[51] Int. Cl.[4] ............................................ F16B 19/00
[52] U.S. Cl. .................................... 411/361; 411/377;
411/901; 411/903; 411/908
[58] Field of Search ................ 411/361, 377, 501, 503,
411/508, 509, 900–903, 907, 908

[56] References Cited
U.S. PATENT DOCUMENTS

| | | | |
|---|---|---|---|
| 3,354,260 | 11/1967 | Brandt et al. | 411/909 X |
| 3,544,143 | 12/1970 | Ohlsson | 411/501 X |
| 4,143,580 | 3/1979 | Luhm | 411/45 |
| 4,230,017 | 10/1980 | Angelosanto | 411/361 X |
| 4,405,256 | 9/1983 | King, Jr. | 411/360 X |
| 4,478,543 | 10/1984 | Lyon | 411/908 X |
| 4,478,544 | 10/1984 | Strand | 411/908 X |

Primary Examiner—Peter A. Nelson
Attorney, Agent, or Firm—Lyman R. Lyon

[57] ABSTRACT

A composite rivet comprises a preformed head portion, a shear portion, an integral mandrel extending from said shear portion having an annular recess therein, a deformable plastic locking ring radially aligned with and filling the recess in said mandrel, and a collar telescoped about and radially aligned with said locking ring for controlling deformation thereof.

3 Claims, 2 Drawing Figures

COMPOSITE RIVET WITH DEFORMABLE PLASTIC LOCKING RING

BACKGROUND OF THE INVENTION

The rivet of the instant invention is an improvement on the composite rivet disclosed in U.S. Pat. No. 4,478,544 issued Oct. 23, 1984, for Composite Rivet, and assigned to the assignee hereof.

Carbon fiber reinforced materials are widely used in the aircraft industry for airframe structural components. However, one characteristic of composite materials utilizing carbon fibers is that the carbon fibers are difficult to reform. Thus, the use of carbon fiber reinforced resins in rivets has heretofore been limited by the difficulty of efficiently forming the rivet heads.

SUMMARY OF THE INVENTION

The aforesaid problem is solved by a collar and locking ring system that is disposed about an integral mandrel portion of the rivet. The mandrel provides a means for tensioning the rivet relative to a workpiece. Compression of a fiber and resin matrix of the locking ring is accomplished by a suitable tool and is enabled by the use of a thermoplastic or "B"-stage thermoset resin matrix, which is softened due to the application of heat. A compound element radially extending rivet head is formed that is locked in a complementary recess adjacent the shear portion of the rivet.

DETAILED DESCRIPTION OF THE PREFERRED EMBODIMENT OF THE INVENTION

Figure 1:
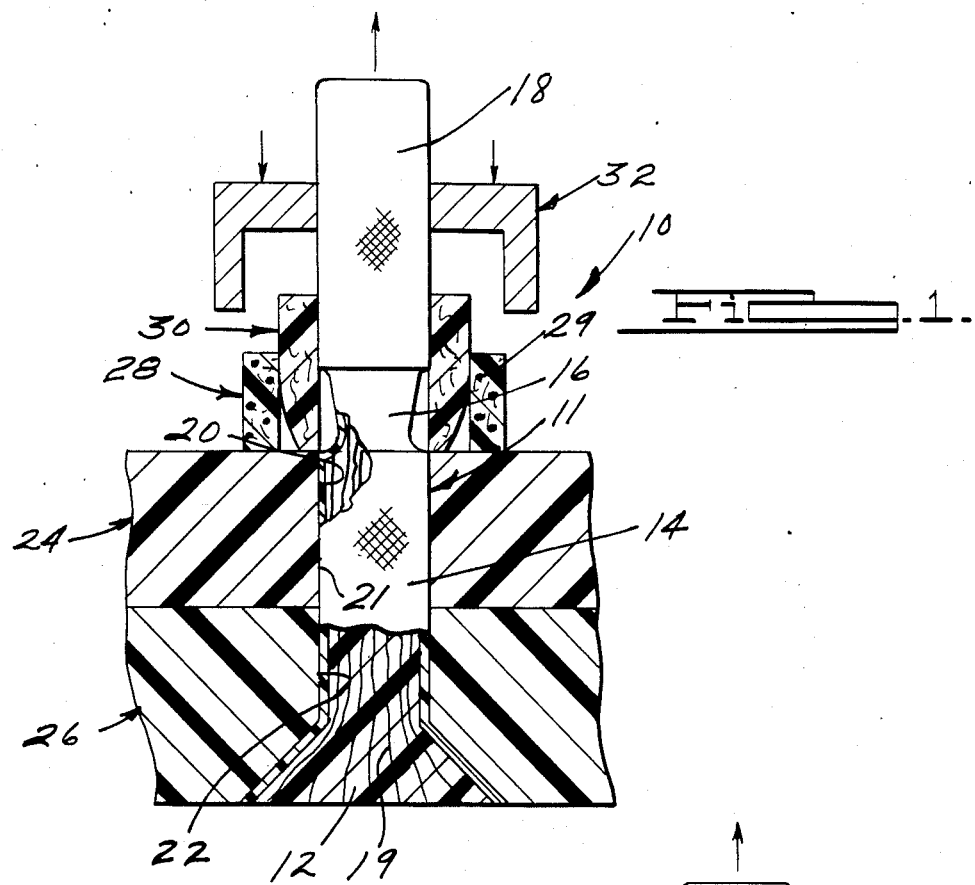
FIG. 1 is a sectional elevational view of a preferred embodiment of the rivet of the instant invention.

As best seen in FIG. 1 of the drawings, a rivet 10 in accordance with a constructed embodiment of the instant invention comprises a thermoset resin preform 11 having a preformed head portion 12, a shear portion 14, an annular recess 16, and an integral mandrel 18 that facilitates tensioning of the rivet 10 incident to installation thereof. The preform 11 is provided with aligned carbon fibers 19 internally thereof and a woven Kevlar sheath 20 that augment the strength thereof. The shear portion 14 of the rivet 10 extends through complementary apertures 21 and 22 in a pair of workpieces 24 and 26, respectively.

In accordance with the present invention, a collar 28 of circumferentially extending filament, wound or braided carbon or Kevlar fibers 29 in a thermoset resin matrix, is disposed about a locking ring 30 which is telescoped over the mandrel portion 18 of the preform 11. The locking ring 30 comprises random orientated chopped carbon fibers in a thermoplastic or "B"-stage thermoset resin matrix.

Figure 2:
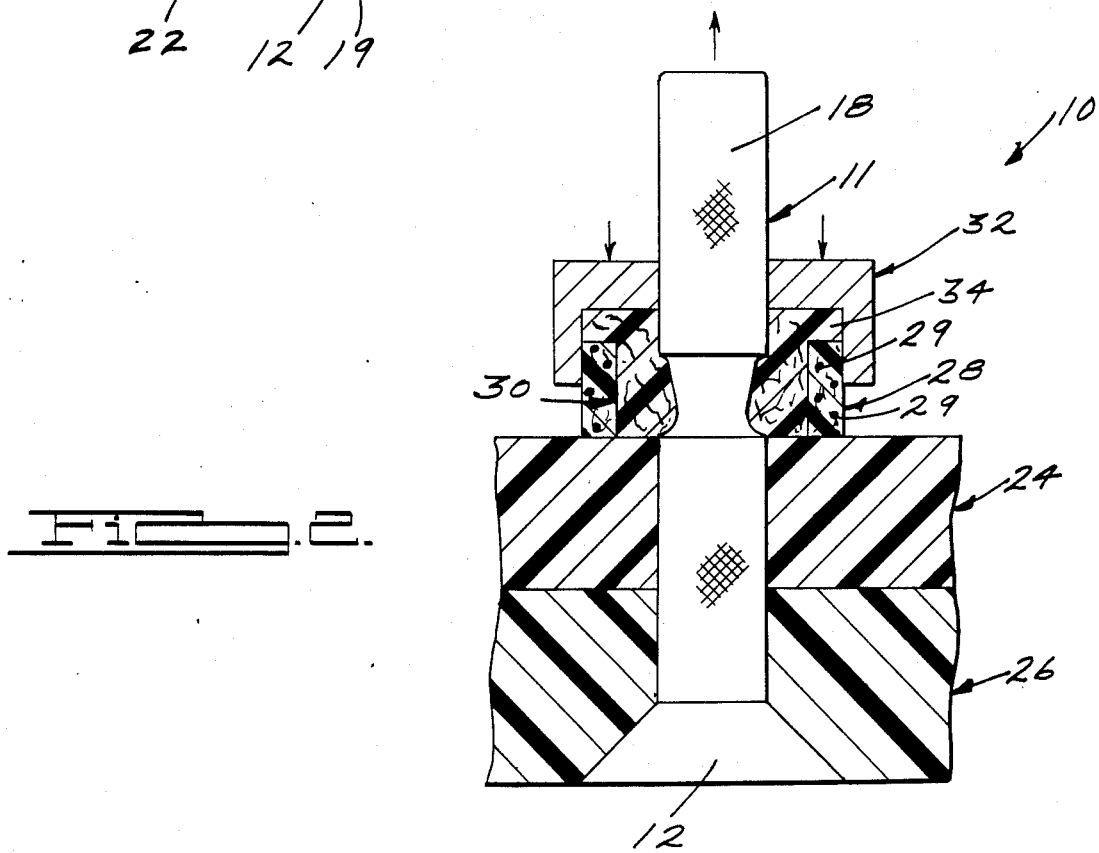
FIG. 2 is a view of the rivet of FIG. 1 after advancement of a forming tool concurrently with tensioning of the rivet mandrel to form a head on the installed rivet.

As seen by comparing FIG. 1 with FIG. 2 of the drawings, the mandrel 18 of the rivet is adapted to be pulled upwardly, after heating of the locking ring 30 by the application of heat by, for example, a hot air blast, preheat thereof, or heating of the entire rivet assembly 10 in situ, while a tool 32 is concomitantly biased downwardly against the locking ring 30 resulting in deformation thereof into the configuration shown in FIG. 2.

A relatively smooth exterior surface is developed on the reformed locking ring 30 which maintains a clamp-up force on the workpieces 24 and 26 in conjunction with the head 12 of the rivet 10. It is also to be noted that the annular recess 16 in the preform 11 is convergently tapered toward the workpiece 24 to aid in plastic flow of the locking collar 30 and to lock the rivet assembly 10 against the workpiece 24. A radially extending head 34 on the locking ring 30 locks the collar 28 against the workpiece 24.

While the preferred embodiment of the invention has been disclosed, it should be appreciated that the invention is susceptible of modification without departing from the scope of the following claims.

I claim:

1. A composite rivet comprising
a preformed head portion,
a shear portion,
an integral mandrel extending from said shear portion having an annular recess therein,
a deformable plastic locking ring radially aligned with and filling the recess in said mandrel, and
a plastic collar telescoped about and radially aligned with said locking ring for controlling deformation thereof, said collar being reinforced with circumferentially extending fibers.

2. A composite rivet comprising
a preformed head portion,
a shear portion,
an integral mandrel extending from said shear portion having an annular recess therein,
a deformable plastic locking ring radially aligned with and filling the recess in said mandrel, and
a plastic collar telescoped about and radially aligned with said locking ring for controlling deformation thereof, said locking ring being reinforced with chopped randomly orientated carbon fibers.

3. A composite rivet for joining first and second workpieces having aligned apertures therein, said rivet comprising
a preformed head portion engageable with said first workpiece,
a shear portion extending through said aligned apertures in said first and second workpieces,
an integral mandrel extending from said shear portion having an annular recess therein,
an annular deformable plastic locking ring radially aligned with and filling the recess in said mandrel, and having one radially extending end face abutting said second workpiece, and
an annular plastic collar telescoped about said locking ring and radially aligned with the recess in said mandrel, said collar having a first radially extending end face abutting said second workpiece, said collar having an axial dimension less than the axial dimension of said locking ring, a portion of said locking ring extending radially outwardly so as to overlie a second radially extending end face of said collar, said collar controlling radial deformation of said locking ring.

* * * * *